3,278,597
SUBSTITUTED TIGLANILIDE HERBICIDES
Ralph P. Neighbors, Olathe, Kans., assignor, by mesne assignments, to Gulf Oil Corporation, Pittsburgh, Pa., a corporation of Pennsylvania
No Drawing. Filed May 8, 1963, Ser. No. 278,976
2 Claims. (Cl. 260—562)

This invention relates to novel compositions possessing utility as herbicides and more particularly to new herbicides which are useful in selective control of plant growth.

It is desirable for herbicidal compositions to be selective, that is that they be capable of killing or arresting the growth of weeds or unwanted vegetation while permitting the growth of crops. Many presently used herbicides require extremely careful control of dosage. Although their action is selective, it is often borderline in this regard, or gives no visible indication of the extent of control acheved until it is almost too late to make a decision regarding a repeated application of control agent.

It is an important feature of the present invention that it provides selective herbicides which quickly produce a chlorosis in green-leaved plants, causing them to become almost white, particularly in all parts which are grown subsequent to application of the herbicide. Thus in a field in which a crop is planted. weeds which have come up recently or which will soon emerge will become bleached, giving visible indication of control. So long as the plants remain bleached, it is assured that control exists, a fact which can be readily determined by visual inspection from the air, if desired. If bleaching is noticed in the crop plants, treatment can be discontinued until the plants recover. If on the other hand, the weeds begin to turn green, a second application of herbicide is indicated. Thus the inspection of crops and the making of decisions regarding repeated use of these herbicides requires very little skill or knowledge, a factor of considerable importance when unskilled agricultural laborers are employed in weed control work.

This invention is based on the discovery that a rather specific class of disubstituted anilides possesses both selective herbicidal activity and the ability to produce chlorosis in affected plants.

According to this invention there are provided selective herbicidal compositions comprising as the active ingredient at least one 2-methyl-2-butenoic anilide compound selected from those corresponding to the general formulas:

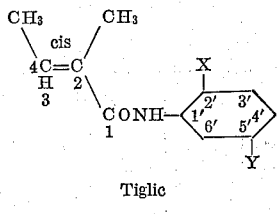

Tiglic and

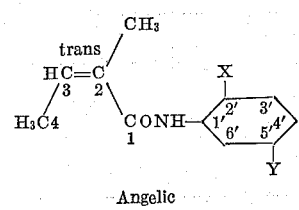

Angelic in which X may be methyl or chloro, Y may be hydrogen, methyl or chloro and with the added provision that X cannot be chloro when Y is hydrogen.

The active ingredients of the herbicidal compositions of this invention are preferably substituted anilides of tiglic acid. In the above structural formula it is indicated that the terminal methyl and 2-methyl groups of the tiglic acid portion of the molecule are in the cis configuration with respect to each other. (Alternatively, it may also be stated that the terminal methyl and carboxamide groups are trans with respect to each other.) When the methyl groups are trans with respect to each other the corresponding compounds of this invention are anilides of angelic acid, which do not possess identical herbicidal properties. For example, 5'-chloro-2'-methylangelanilide is considerably less active as a post-emergent herbicide than the corresponding tiglanilide. In actual practice of this invention the most economically attractive products are the tiglanilides containing minor amounts of angelanilides present as impurities. If the angelanilides were considerably more toxic and less selective, purification of the tiglanilides would be necessary, adding to the cost of production. Fortunately this is not the case. In order to obtain the maximum advantage from the individual characteristics of the angelanilides, on the other hand, removal of more active tiglanilides is necessary. Furthermore, derivatives of angelic acid are more difficult to prepare and more expensive than those of tiglic acid. Since there is a strong tendency for isomerization of angelic to tiglic acid during preparation, this cost differential is not likely to be eliminated in the forseeable future. In view of this combination of chemical biological and economic factors, the preference for the specific class of tiglanilides over the corresponding angelanilides of this invention is unavoidable.

It has been suggested that herbicidal activity of substituted anilides can be correlated with molecular dimensions (Huffman and Allen, "Agr. and Food Chem.," vol. 8, pages 298–302 (1960)). Tiglanilides and angelanilides, however, have about the same molecular dimensions, and there is no apparent reason for the difference in herbicidal activity which is exhibited by corresponding cis and trans isomers. It has been determined, furthermore, that tiglanilides possessing the same substituent groups in positions other than 2' and 5' fail to show the same combination of herbicidal properties. In general these isomeric forms appear to be either less toxic or less selective, or both, or do not possess a comparable ability to cause chlorosis.

Various known methods for the production of anilides from other acids, acid chlorides and esters may be employed to prepare the tiglanilides and angelanilides of this invention, by use of the corresponding substituted aniline compound and tiglic or angelic acid or a suitable derivative thereof. For an excellent review on tiglic and angelic acids and their derivatives, reference may be made to the paper by Buckles et al. in "Chemical Reviews," vol. 55, 659–678 (1955). The following example presents a convenient method of synthesis which is applicable to the entire group of tiglanilides employed as herbicides in the compositions of this invention.

EXAMPLE 1

Preparation of 5'-chloro-2'-methyltiglanilide (a) A mixture of 5-chloro-2-methylaniline (0.08 mol), pyridine (0.08 mol) and 150 ml. of benzene was stirred and cooled to 15° C. Tiglyl chloride (0.08 mol) was added, dropwise, to the stirred mixture at 15–25° C. The mixture was stirred for two hours after addition was complete, 100 ml. of water was added and stirring was continued for an additional 15 minutes. The organic layer was then separated, diluted with hexane and chilled to 0° C. The solid which precipitated on cooling was removed by filtration and was recrystallized from an ethanol-water mixture to give a 79% yield of 5'-chloro-2'-methyltiglanilide, M.P. 86–87° C.

*Analysis.*—Calcd. for $C_{12}H_{14}ClNO$: C, 64.43; H, 6.31; N, 6.27; Cl, 15.80. Found: C, 64.17; H, 5.63; N, 5.98; Cl, 16.03.

EXAMPLES 2–5

The following compounds were also prepared according to the procedure of Example 1:

(2) 2',5'-dimethyltiglanilide, 63% yield, M.P. 87–88° C.

*Analysis.*—Calcd. for $C_{13}H_{17}NO$: C, 76.81; H, 8.43; N, 6.89. Found: C, 76.83; H, 8.40; N, 6.91.

(3) 2'-chloro-5'-methyltiglanilide, 81% yield, M.P. 79–80° C.

*Analysis.*—Calcd. for $C_{12}H_{14}ClNO$: C, 64.43; H, 6.31; N, 6.27; Cl, 15.80. Found: C, 64.60; H, 6.35; N, 6.25; Cl, 15.37.

(4) 2'-methyltiglanilide, 75% yield, M.P. 61–63° C.

*Analysis.*—Calcd. for $C_{12}H_{15}NO$: C, 76.15; H, 7.99; N, 7.40. Found: C, 76.00; H, 7.94; N, 7.30.

(5) 2',5'-dichlorotiglanilide, 53% yield, M.P. 64–66° C.

*Analysis.*—Calcd. for $C_{11}H_{11}Cl_2NO$: C, 54.12; H, 4.54; N, 5.74; Cl, 29.05. Found: C, 54.41; H, 4.48; N, 5.58; Cl, 28.73.

The substituted tiglanilide herbicides of this invention may be applied as a pre-emergent or post-emergent treatment. In pre-emergent treatment the herbicide is applied in combination with an inert carrier preferably in the form of a spray or a granular solid at planting time. In addition a pre-emergent treatment may be repeated after the crop is standing, to prevent further emergence of weeds, preferably in the form of a granular solid formulation, to reduce the effect on crop plant foliage. In post-emergent treatment the herbicide is applied to the growing plant, preferably in the form of an aqueous dispersion, made with the use of water as principal inert carrier along with such auxiliary agents such as solvents, emulsifiers and dispersing and penetrating agents. The following formulation is representative of the emulsifiable type, suitable for spray application:

| | Percent |
|---|---|
| Active ingredient | 10 |
| Solvent (approx. 50% xylene–50% kerosene) | 35 |
| Emulsifier (for example, Emulphor EL–719, a polyoxyethylated vegetable oil) | 55 |

About 4 to 5 parts of this emulsifiable concentrate may be mixed with about 35 parts of water to produce an aqueous dispersion for spray application.

The herbicides of this invention may also be prepared in the form of wettable powders, employing dry inert materials such as kaolin to prevent caking, and may be compounded with clays, powdered chalk and other suitable solids and pelletized to yield granular solid formulations.

The herbicidal compounds prepared in Examples 1 to 5 were employed in preparation of emulsifiable formulations of the type disclosed above and were tested on plants from ten to eighteen days after emergence at an application rate of 5 pounds of active ingredient per acre and a spray volume of 60 gallons per acre. Seven days after treatment the plants were observed. The results are shown in the following table. The results are rated as follows:

C=chlorosis          0=no effect.
N=necrosis           1=slight effect.
G=growth inhibition  2=moderate effect.
K=non-emergence      3=severe effect.
F=formative effect   4=maximum effect or dead plants.

The pre-emergence effectiveness of the herbicidal compounds of Examples 1 to 5 was tested by dissolving approximately 3 parts of active ingredient in 2000 parts of acetone as inert carrier and spraying seeded flats with the solution at the application rate of 10 pounds per acre. After 21 days at 75–85° F. day temperature, the treated flats were examined. The results are also shown in the table.

EXAMPLE 6

The 5'-chloro-2'-methylangelanilide corresponding to the tiglanilide of Example 1 was prepared by essentially the same procedure and the two were compared for both pre-emergent and post-emergent herbicidal activity. The results, also tabulated below, show clearly that presence of the corresponding angelanilide in the tiglanilide as an impurity would not substantially increase overall toxicity nor detract from selectivity by additive effect. Thus minor proportions of corresponding angelanilides may be tolerated. On the other hand it is evident that the angelanilides are sufficiently active to possess individual utility.

The properties of 5'-chloro-2'-methylangelanilide are as follows:

M.P. 110–112° C.

*Analysis.*—Calcd. for $C_{12}H_{14}ClNO$: C, 64.43; H, 6.31; N, 6.27; Cl, 15.80. Found: C, 64.95; H, 5.86; N, 6.10; Cl, 15.79.

TABLE I.—HERBICIDAL TEST DATA

| | Wheat | | Alfalfa | | Brome | | Flax | | Oats | | Radish | | Sugar Beets | |
|---|---|---|---|---|---|---|---|---|---|---|---|---|---|---|
| | Post | Pre- | Post | Pre- | Post | Pre- | Post | Pre- | Post | Pre- | Post | Pre- | Post | Pre- |
| Example 1 | 0 | | N4 | N4 | | N4 | 0 | N4 | 0 | N4 | N1 | N4 | N4 | N4 |
| Example 2 | 03 | | N4 | N4 | | N4 | C2 | N4 | C1 | N3 | C3 | N4 | N4 | N4 |
| Example 3 | 0 | | N2 | N4 | | C2 | 0 | C2 | 0 | N1 | N1 | 0 | N2 | N3 |
| Example 4 | 0 | | N3 | N4 | | C2 | N1 | C2 | 0 | 0 | C1 | C3 | N2 | N4 |
| Example 5 | C1 | | C2 | N4 | | N2 | C1 | C1 | C1 | C2 | C1 | C2 | N3 | N4 |
| Example 6 | 0 | | C1 | C4 | | C3 | 0 | C2 | 0 | C2 | C1 | C2 | 0 | N4 |

| | Corn | | Coxcomb | | Cotton | | Crabgrass | | Millet | | Soybeans | | Tomato | |
|---|---|---|---|---|---|---|---|---|---|---|---|---|---|---|
| | Post | Pre- | Post | Pre- | Post | Pre- | Post | Pre- | Post | Pre- | Post | Pre- | Post | Pre- |
| Example 1 | 0 | N4 | | N4 | | C1 | | N4 | 0 | N4 | 0 | N4 | N1 | |
| Example 2 | C2 | N4 | | N4 | | C1 | | N2 | N4 | N3 | G2 | N4 | N2 | |
| Example 3 | 0 | G1 | | N2 | | 0 | | 0 | N1 | N1 | 0 | N4 | N1 | |
| Example 4 | 0 | C2 | | N3 | | 0 | | C1 | 0 | C1 | 0 | 0 | N1 | |
| Example 5 | C1 | C2 | | N4 | | 0 | | N1 | C2 | N2 | N1 | C1 | N1 | |
| Example 6 | C1 | C3 | | C2 | | 0 | | C4 | C1 | C4 | C1 | C3 | N1 | |

From the test results it will be seen that the herbicidal agents disclosed herein are useful for treatment of cotton crops for control of undesired plants. The herbicidal agents of Examples 3 and 4 are useful for control of weeds in wheat, oats and corn. Additional utility of the herbicidal agents disclosed herein, taken individually and in combination, will be apparent to those who are skilled in the art. If it is desired to emphasize the bleaching effect, the rate of application may be reduced. At high rates of application the plants may die so quickly that chlorosis will not be observed.

Because of the high level of biological activity of the tiglanilides of this invention, they are applied to plant life along with inert carriers, so as to obtain even distribution and minimize loss of individual plants from overdosage. Water is a preferred inert carrier, although, in some instances, organic solvents may possess advantages which justify the greater expense involved. If it is desired to prepare an emulsifiable concentrate for dilution with water, the active ingredient is formulated with an organic solvent and an emulsifier. The active ingredient may also be mixed with an inert solid as carrier, for use as a dust under some circumstances, but preferably in combination with a dispersing agent for the purpose of making the powder wettable and giving better spreading and more intimate contact with plant foliage. Dispersing agents are also used to good advantage with water and organic solvents as inert carriers.

Various combinations and modifications of compositions and methods may be made without departing from the spirit and scope of this invention, as will be apparent to those who are skilled in the art.

What is claimed is:
1. 5′-chloro-2′-methyltiglanilide.
2. 2′-5′-dimethyltiglanilide.

References Cited by the Examiner

UNITED STATES PATENTS

| | | | |
|---|---|---|---|
| 2,762,696 | 9/1956 | Gerjovich et al. | 71—2.6 |
| 2,863,752 | 12/1958 | Hamm et al. | 260—562 X |

FOREIGN PATENTS

| | | |
|---|---|---|
| 495,933 | 9/1953 | Canada. |
| 1,005,784 | 9/1957 | Germany. |
| 885,043 | 12/1961 | Great Britain. |

OTHER REFERENCES

Huffman et al.: Jour. Agr. and Food Chem. vol. 8, No. 1, pp. 298–302 (1960).

Noller Chemistry of Organic Compounds, 2nd ed., p. 789, Saunders, Philadelphia, 1957.

WALTER A. MODANCE, *Primary Examiner.*

NICHOLAS RIZZO, *Examiner.*

ROBERT PRICE, NATALIE TROUSOF,
*Assistant Examiners.*